Sept. 10, 1968 G. B. KARNOFSKY 3,400,549
METHODS AND MEANS FOR PRODUCING POTABLE WATERS
Filed Aug. 10, 1966
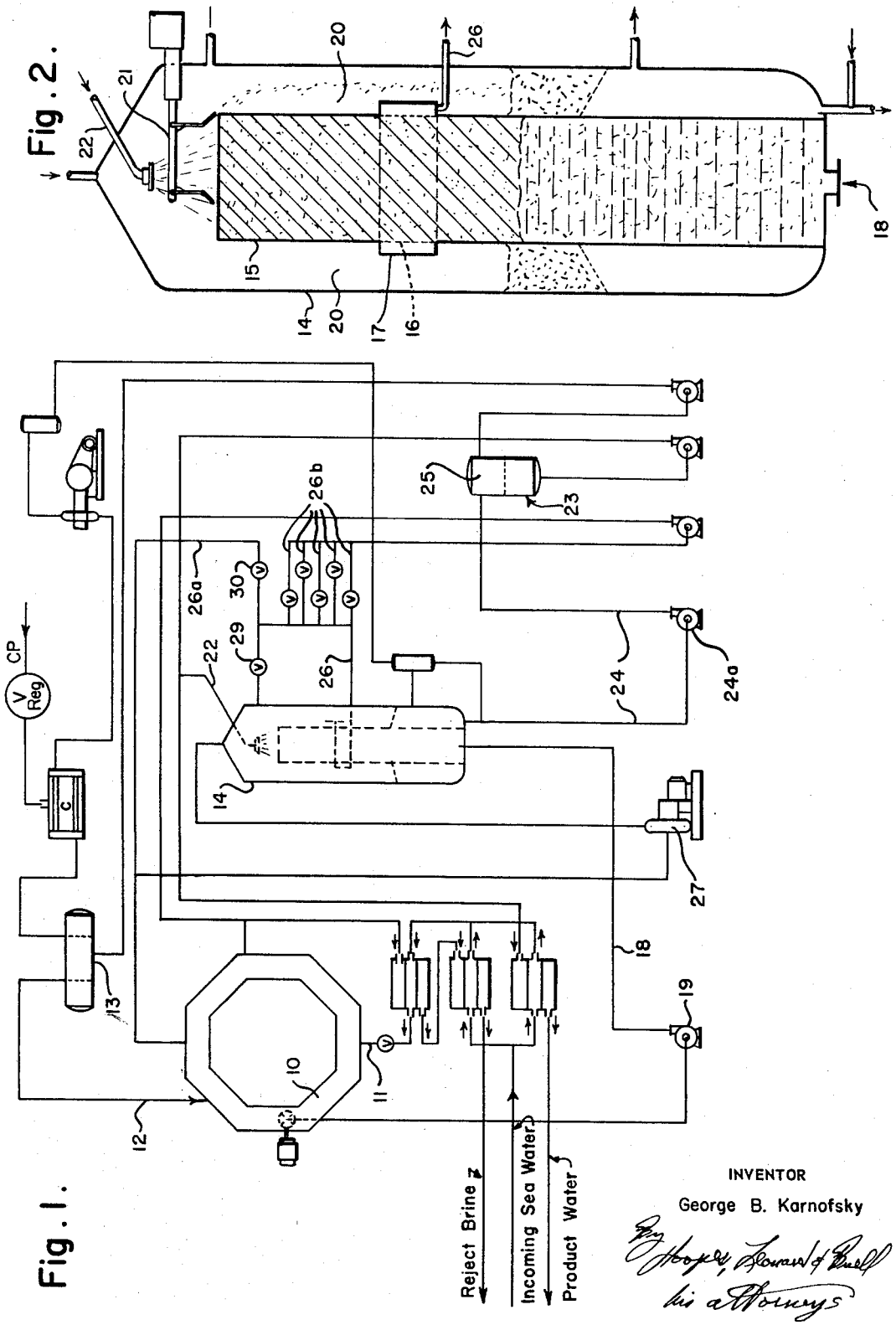
INVENTOR
George B. Karnofsky United States Patent Office 3,400,549
Patented Sept. 10, 1968

3,400,549
METHODS AND MEANS FOR PRODUCING
POTABLE WATERS
George B. Karnofsky, Mount Lebanon Township, Allegheny County, Pa., assignor to Blaw-Knox Company, Pittsburgh, Pa. a corporation of Delaware
Filed Aug. 10, 1966, Ser. No. 571,611
5 Claims. (Cl. 62—58)

ABSTRACT OF THE DISCLOSURE

An apparatus is provided for producing potable water from saline water using a freezing or ice crystallization method including a washing step carried out in a vertical washer column. Wash water is added at the top of the column, ice slurry is added at the bottom of the column and intermediate the top and bottom there is provided a perforate portion for separating brine from the ice slurry. The perforate portion is surrounded by a chamber which is maintained at a reduced pressure in order to accelerate the separation of ice and brine.

---

This invention relates to methods and means for producing potable waters and particularly to producing potable waters from saline water. The invention is more particularly directed to the ice washing step of systems using a freezing or ice crystallization method of recovering potable waters from saline waters. A plant using such a freezing system is disclosed in my copending application Ser. No. 567,201 filed July 22, 1966.

In the extraction of potable water from saline water by the ice freezing method, an essential step is the separation of the ice crystals from the brine in which they are formed. In a preferred method of accomplishing this, the ice crystals are washed with water in a vertical moving ice bed, the wash water moving countercurrently to the motion of the ice, as described by Dr. H. F. Wiegandt in the Research and Development Progress Report No. 41, Office of Saline Water, U.S. Department of the Interior, PB 161906, (1960) pages 17 to 23 inclusive. The present invention is directed to a modification of such vertical column washing process and apparatus which markedly creases the operating rate of a column of given horizontal dimensions.

In the vertical column washer, an ice bed is pushed vertically upward past vertical screens by a hydraulic piston of ice moved by brine flowing upward from the bottom of the column concurrently with and at higher velocity than the ice and then out through the screens. The incoming brine carries with it as a slurry ice formed in a preceding freezing operation. Above the screens, wash water applied to the top of the ice bed flows downwardly by gravity toward the screens, countercurrently to the ice, and exits through the screens with the brine displaced from the washed ice. Ice is continuously cut from the top of the upward moving ice bed, and removed to a melter.

In the ordinary mode of operating this system, flow of wash water through the ice is by gravity head only. Consequently, the rate of production is limited to that corresponding to some maximum ice velocity (the maximum depending on the permeability of the ice bed), as explained in the Wiegandt paper previously cited. At higher ice velocities brine is entrained with the ice, and cannot be displaced by the countercurrent flow of wash water. This can be remedied by increasing the pressure difference available for displacing brine from the ice bed. My present invention is concerned with this, and is particularly applicable to the system shown in my copending application Ser. No. 154,502 filed Nov. 24, 1961, now Patent No. 3,338,064 issued Aug. 29, 1967. In that system ice is made by vaporizing a refrigerant such as normal butane in direct contact with saline water. Refrigerant vapor from the freezer is compressed, and the compressed vapor is applied to the ice in the melter, which is an annular space surrounding the vertical column washer. The vapor is compressed sufficiently so that there is a transfer of heat from the condensing refrigerant vapor to melting ice in this space. By this means, refrigerant vapor is liquefied for recycling to the freezer. Compressed vapor enters the washer-melter vessel above the column of ice in the washer, thereby establishing the absolute pressure at the top of the ice column at the pressure required to melt ice.

In the system of the copending application, brine is withdrawn from the ice column through vertical screens into a chamber which is vented to the top of the washer-melter vessel. The pressure in this chamber is therefore that of the melter. In the system of this invention, this chamber is vented either to the suction of the compressor which removes vapor from the freezer or to the top of the washer-melter vessel. By means of control valves in these vent lines, as will be hereinafter described, the pressure in the chamber can be controlled to any pressure between that of the freezer and that in the melter.

The ice slurry that results from freezing by direct contact of vaporizing refrigerant is saturated with refrigerant, whose vapor pressure is substantially equal to the pressure maintained in the freezer vessel. If the pressure above the ice-brine slurry leaving the freezer is reduced to less than that existing in the freezer, vaporization of refrigerant will occur. Such vaporization is undesirable in the washer because formation of vapor bubbles impairs its performance. Since the brine temperature in the aforesaid chamber is substantially the same as in the freezer, no vaporization in the washer can occur as a result of venting the chamber to the suction of the compressor because the pressure in the chamber can never be less than that in the freezer.

Since the difference between the pressures at the suction and discharge sides of the compressor which are also the pressures in the freezer and melter respectively can amount to as much as 10 feet of water head, the increased available head for withdrawing brine from the moving ice bed by venting the chamber as described above, is quite large compared with that available from gravity alone. Use of this pressure difference to enhance withdrawal of brine through the screens is fool-proof since the pressure in the chamber surrounding the screens cannot be reduced to the point where refrigerant vaporization takes place. Moreover, there is no additional burden on the compressor. Practice of the disclosed process requires only the addition to the apparatus of the aforesaid copending application of a vent connection and control valve between the chamber and the suction of the compressor. Increasing the production rate in the column washer without increasing its horizontal dimensions may also require that the height of the washer be increased so that the upward force asserted by the hydraulic piston will be increased, as is well known to the art.

In a preferred embodiment of my invention I provide an ice forming vessel receiving water, such as sea water, to be purified together with a liquefied vaporizable refrigerant in intimate contact, a compressor having its low pressure side connected to the ice forming vessel and having its high pressure side connected to an ice melter where refrigerant is condensed, a vertical ice washer column having a perforate wall portion intermediate its top and bottom, said perforate portion being surrounded by a housing to form a chamber, connections between the ice forming vessel delivering the ice and unfrozen liquid (brine, in the case of sea water) to the bottom of the washer column, means delivering wash water to the top of the washer column, connections between said chamber and the suction side of said compressor whereby the chamber is under relatively reduced pressure, and means removing ice from the top of the column, said column having a length sufficient to provide an ice bed below the screens sufficient to generate an upward force on the ice above the screens equal to the downward effective weight of ice and wash water, plus friction.

In the foregoing general description, I have set out certain objects, purposes and advantages of my invention. Other objects, purposes and advantages of my invention will be apparent from a consideration of the following description of the accompanying drawings in which:

FIGURE 1 is a diagrammatical showing of a basic potable water system embodying my invention; and FIGURE 2 is an enlarged sectional view of the vertical column washer-melter 14 in FIGURE 1.

Referring to the drawings, I have illustrated a freezer or ice forming vessel 10 having a sea water inlet line 11 and a liquid butane inlet 12 from a liquid butane surge tank 13. A vertical column washer-melter vessel 14 is also shown. It is here illustrated as a vessel of rectangular horizontal cross section, FIGURE 2 being a vertical sectional view thereof; but the particular horizontal form is not critical and the vessel could, for example, be vertically cylindrical one as shown and described in my copending patent application Ser. No. 567,201. In the embodiment of FIGURES 1 and 2, the vessel 14 is provided with a central washer column 15. In each side of the column 15, oppositely positioned, there is provided a perforate or screen portion 16 surrounded by a housing forming a chamber 17. The freezer vessel 10 is connected to the bottom of vertical column 15 by a line 18 and a slurry pump 19 which deliver the mixture of ice and brine formed in the freezer vessel into the bottom of the column 15. Two melter zones 20 of rectangular horizontal cross section enclose the vertical washer column. Ice is cut from the top of the vertical washer column 15 by a reciprocating ice cutter 21. Wash water is sprayed onto the top of the ice in vertical column 15 by line 22 which by-passes a part of the product water delivered from product tank 23, which in turn receives water from the bottom of melter 20 discharged by line 24 and pump 24a through decanter 25. Each chamber 17 is connected to a brine line 26. Brine from line 26 overflows through the lowermost of several cross connections 26b which is open. A primary compressor 27 withdraws refrigerant vapor from the freezer 10 and delivers compressed vapor to the top of the washer-melter vessel 14.

Outlet line 26 from compartment 17 is selectively vented through valve 29 to the top of the washer-melter vessel 14 or through valve 30 in the line 26a to the suction side of compressor 27. Pressure in the chamber 17 surrounding the screen 16 may thus be controlled at any absolute pressure between that in the freezer 10 and in the washer-melter 14 by manipulation of the valves 29 and 30. Such pressure control can be used to advantage in controlling the efficiency of ice washing, as measured by the wash water lost per pound of ice washed, while simultaneously permitting, as the pressure in the housing 17 is reduced, increased throughput of ice.

In the foregoing description, I have described a basic apparatus for producing potable water from sea water or other like non-potable water. FIGURE 1, which is a general flow diagram, includes diagrammatic representation of auxiliary equipment such as heat interchangers and a secondary refrigerant compressor which are necessary in a plant but do not require description herein since they do not concern this specific improvement. The apparatus and method of operation may incorporate variations which are well known in art, without departing from the spirit of this invention. Accordingly, it will be understood that this invention may be embodied in other apparatus and methods within the scope of the following claims.

I claim:

1. An apparatus for producing potable water from sea and like non-potable waters comprising an ice forming vessel receiving non-potable water to be purified together with a liquefied vaporizable refrigerant in intimate contact, compressor means for liquefying vaporizable refrigerant having a low pressure side connected to the ice forming vessel for receiving refrigerant vapor therefrom and a high pressure side delivering vaporized refrigerant for liquefaction or melting ice, a vertical ice washer column having a perforate portion intermediate its top and bottom, said perforate portion being surrounded by a chamber, connections between the ice forming vessel and the bottom of said washer column delivering ice and non-potable water residue formed in said ice forming vessel to the bottom of said column, means delivering wash water to the top of said vertical column, connections between said chamber and the suction side of said compressor means whereby the chamber is under relatively reduced pressure and means removing ice from the top of said column, said column having a length sufficient to provide an ice bed below the perforate portion sufficient to generate an upward force on the ice above the perforate portion equal to the effective weight of ice and wash water plus friction.

2. An apparatus as claimed in claim 1 wherein the chamber is provided with selective valved connections to the top of the vertical column and to the suction side of the compressor whereby the pressure difference between the top of the column and said chamber may be varied from zero to the differential pressure generated by the compressor.

3. In an apparatus for producing potable water from sea and like non-potable waters having means for producing a slurry of ice in a residue of non-potable water comprising a vertical ice washer column having a perforate portion intermediate its top and bottom, said perforate portion being surrounded by a chamber, said ice washer receiving the slurry of ice at the bottom, means delivering wash water to the top of said vertical column, means removing concentrated non-potable water from said chamber and pressure reducing means separate from said water removing means connected to said chamber whereby the chamber is under relatively reduced pressure.

4. In the method of washing ice produced by the partial freezing of saline water by direct contact with a vaporizable refrigerant the vapors of which are compressed and condensed by direct contact with melting ice and recycled in liquid form to the freezing step and the ice separated from the concentrated brine by washing in an upwardly moving vertical column from which the brine is separated at a zone intermediate the top and bottom of the column and the ice is washed with fresh water in the column above said zone, the top of said column being maintained at the pressure of the compressed refrigerant vapors, removing concentrated non-potable water from the zone, the improvement which comprises maintaining said zone at a pressure between that of the compressed and uncompressed refrigerant vapor with pressure reducing means separate from said non-potable water removing means.

5. In the method of washing ice produced by the partial freezing of saline water by direct contact with a vaporizable refrigerant the vapors of which are compressed and condensed by direct contact with melting ice and recycled in liquid form to the freezing step and the ice separated from the concentrated brine by washing in an upwardly moving vertical column from which the brine is separated at a point intermediate the top and bottom of the column and the ice is washed with fresh water in the column above said point, the top of said column being maintained at the pressure of the compressed refrigerant vapors, the improvement which comprises maintaining said point at a pressure between that of the compressed and uncompressed refrigerant vapor by application of an adjustable amount of suction from the refrigerant compressor to said point.

References Cited

UNITED STATES PATENTS

| 3,251,193 | 5/1966 | Wiegandt | 62—123 X |
| 3,255,603 | 6/1966 | Johnson et al. | 62—123 |
| 3,259,181 | 7/1966 | Ashley et al. | 62—123 |

ROBERT A. O'LEARY, *Primary Examiner.*

W. E. WAYNER, *Assistant Examiner.*